US007503569B2

(12) United States Patent
Duvigneau

(10) Patent No.: US 7,503,569 B2
(45) Date of Patent: Mar. 17, 2009

(54) PORTABLE CONTAINER ASSEMBLY

(75) Inventor: Nikolai Duvigneau, Caesarea (IL)

(73) Assignee: Keter Plastic Ltd., Herzelyia (IL)

( * ) Notice: Subject to any disclaimer, the term of this patent is extended or adjusted under 35 U.S.C. 154(b) by 27 days.

(21) Appl. No.: 11/430,006

(22) Filed: May 9, 2006

(65) Prior Publication Data

US 2007/0012694 A1 Jan. 18, 2007

Related U.S. Application Data

(60) Provisional application No. 60/681,159, filed on May 16, 2005.

(51) Int. Cl.
*B62B 1/04* (2006.01)

(52) U.S. Cl. .................. 280/47.18; 190/18 A; 190/110; 220/23.83

(58) Field of Classification Search ................ 190/15.1, 190/18 A, 103, 105, 109, 110, 111; 220/23.83; 224/575, 576, 153; 280/47.17, 47.18, 47.34
See application file for complete search history.

(56) References Cited

U.S. PATENT DOCUMENTS

| | | | | |
|---|---|---|---|---|
| 5,011,013 | A * | 4/1991 | Meisner et al. | 206/373 |
| 5,209,384 | A * | 5/1993 | Anderson | 224/580 |
| 5,240,264 | A | 8/1993 | Williams | |
| 5,664,652 | A * | 9/1997 | Shamah | 190/18 A |
| 5,833,065 | A * | 11/1998 | Burgess | 206/373 |
| 6,126,003 | A | 10/2000 | Brouard | |
| 6,176,559 | B1 * | 1/2001 | Tiramani et al. | 312/108 |
| 6,347,847 | B1 | 2/2002 | Tiramani et al. | |
| 6,371,320 | B2 * | 4/2002 | Sagol | 220/4.27 |
| 6,601,930 | B2 | 8/2003 | Tiramani et al. | |
| 6,761,366 | B1 * | 7/2004 | Klemmensen et al. | 280/47.26 |
| 7,004,481 | B1 * | 2/2006 | Stanish | 280/37 |
| 7,210,689 | B2 * | 5/2007 | Guirlinger | 280/47.19 |
| 2003/0062232 | A1 | 4/2003 | Godshaw et al. | |
| 2004/0211634 | A1 * | 10/2004 | Chan | 190/108 |
| 2006/0012139 | A1 | 1/2006 | Guirlinger | |
| 2006/0027475 | A1 * | 2/2006 | Gleason et al. | 206/373 |

FOREIGN PATENT DOCUMENTS

| | | |
|---|---|---|
| DE | 203 13 481 U1 | 2/2004 |
| GB | 2 404 575 A | 2/2005 |

OTHER PUBLICATIONS

Internet citation <http://www.stanleytools.com/default.asp?Category=Soft+Storage&Type=Product&PartNumber=516100M&SDesc+Stanley%26%23174%3B+Hard+Base+Cantilever+Tool+Bag> Internet Archive showing this hard base model published in 2005.

* cited by examiner

*Primary Examiner*—Christopher P Ellis
*Assistant Examiner*—John D Walters
(74) *Attorney, Agent, or Firm*—The Nath Law Group; Jerald L. Meyer; Derek Richmond

(57) ABSTRACT

A wheeled cabinet assembly comprising a wheeled base cabinet fitted with a locomoting handle, and at least one detachable container made from a pliable material and designed as an independent carrying bag wherein a base portion of the carrying bag is attachable over a top edge of the base cabinet at an upright position or at a bottoms up position.

19 Claims, 9 Drawing Sheets

PORTABLE CONTAINER ASSEMBLY

This application claims the benefit of prior U.S. provisional patent application No. 60/681,159 filed May 16, 2005, the contents of which are hereby incorporated by reference in their entirety.

FIELD OF THE INVENTION

This invention relates generally to containers adapted to store any items a person may require such as hobby gear (fishing equipment, remote controlled items, etc), tools, nuts and bolts, and whatever other articles a worker requires to perform various tasks at a workplace, and more particularly to a portable container assembly which can be wheeled to a workplace.

Whilst hereinafter in the specification and claims the assembly is referred to as a tool assembly, it should be understood in its broad meaning, namely suited for any type of equipment and gear.

BACKGROUND OF THE INVENTION

When a mechanic works in a garage to repair automobiles, the tools, the gauges, the bolts and all other articles he may require for this purpose are then available to the mechanic in a workshop.

But when a worker is required to go to a work place which is not a workshop in that it lacks the tools and other articles needed by the worker to perform various tasks, then the worker must bring along to the work place whatever tools and articles he needs to do the job he is expected to carry out, thereby converting the unequipped work place into a workshop.

In those cases where the tools and other articles the worker requires for the job at the work place can be stored in a tool box, then the worker can hand carry the tool box to the work place and then, in effect, transform it to a workshop. But more often than not, what the worker needs to bring to the work place cannot be fully accommodated even in an exceptionally large-capacity tool box.

To make it possible to wheel to a workplace a container capable of storing not only tools but whatever other articles are necessary to carry out the job to be performed at the work place, it is known to provide for this purpose a portable, wheeled container. Examples of rolling container assemblies are disclosed, for example, in U.S. Pat. No. 6,374,847 to Tirami et al, directed to a foiling containers assembly including (a) a base cabinet including wheels and (b) at least one additional cabinet being removably connectable on top of the base cabinet, the additional cabinet having a pulling handle for locomoting the rolling containers assembly.

U.S. Pat. No. 6,374,847 also to Tirami et al. is directed to a rolling containers assembly including (a) a base cabinet including wheels and a pulling handle for locomoting the rolling containers assembly; and (b) at least one additional cabinet being removably connectable on top of the base cabinet.

U.S. Pat. No. 6,371,320 assigned to the same Applicant as the present invention is concerned with a portable workshop container assembly adapted to store tools and other articles a worker requires to perform various tasks at a workplace. The assembly includes three major components in stacked relation. The lower component is a wheeled bucket, the middle component is a tray nested in the bucket and provided with a rim, and the third component is a tool box that rests on the rim. Also provided is a latching mechanism having a latch which is pivoted by a toggle member to the upper end of the bucket and cooperates with a first catch element mounted at the bottom of the tool box and a second catch element mounted on the rim of the tray. When the tool box rests on the rim, the first and second catch elements are then adjacent each other. In one mode of operation, the latch simultaneously engages the first and second latch elements to interlock all three components to form a unitary assembly that can be wheeled to the work place.

Still an arrangement is disclosed in U.S. Pat. No. 5,240,264 is concerned with a wheeled container having multiple closed compartments which can be removed and handled individually. The container can be easily assembled and disassembled for storage and transport, and where the wheels which fold away when not in use.

At times there may be a need to carry items to a location to where the wheeled container can not be locomoted, e.g. owing to sandy or rough terrain. For example, when going fishing, the fisherman may locomote the wheeled assembly as near as the shore but will not take it in the water with him. Another example may be a repairman required to carry some tools and equipment to install a chandelier. He may wheel the wheeled assembly as near as below the working site but will then have to climb up and down a ladder each time he wishes to reach for a tool or piece of equipment.

It is an object of the present invention to provide a wheeled container assembly, wherein at least one container is a detachably articulated for carrying away items in an easy to carry container made of pliable material.

SUMMARY OF THE INVENTION

According to the present invention there is provided a cabinet assembly comprising a wheeled base cabinet fitted with a locomoting handle, and at least one detachable container made from a pliable material and designed as a carrying bag.

The term carrying bag as used herein denotes a bag substantially made of pliable material e.g. fabric, Gore-Tex™, plastic, etc. and fitted with carrying means e.g. one or more of handles, shoulder straps and back straps, or a combination thereof.

The carrying bag (detachable container), according to one embodiment, is fitted with a base portion made of a substantially rigid material and fitted for articulation to the wheeled based cabinet. Said base portion comprises catch arrangements for engagement with a latch of the base cabinet. The base portion may by in the form of a frame supporting a sheet material serving as a base, or it may be a solid member with a solid base.

According to one embodiment of the invention, the carrying bag is detachably mounted over a top surface of base cabinet such that there extends a gap between said top surface and between the base portion of the carrying bag, said gap serving as a storage compartment for carrying straps of the bag, while not in use.

The base cabinet may be designed in different modifications. For example, it may comprise one or more bins tiltable between an inclined, open position and an upright (erect) closed position. There may also be provided one or more drawer units slidingly received within the base cabinet. One or more may be incorporated in the base cabinet for storage of small items, said trays being designed for removal from the base cabinet.

According to one particular design, the base cabinet is in the form of a basket or bucket with an open top closable by a tray, and where the carrying bag is fitted for detachably connecting to the tray or directly to the upper edge of the bucket.

The base cabinet may be part of a modular system where modular elements adapted for interconnecting are provided such that a user may assemble an array of compartments and cabinets to create a base cabinet, however with the carrying bag constituting one of said modular elements, typically adapted for articulating as an uppermost component.

According to an embodiment of the present invention, a top member of the base cabinet is formed with a top wall surface for supporting the carrying bag and optionally there is a peripheral shoulder around at least a portion of said top wall surface, snuggling respective portions of a base portion of the carrying bag.

The base portion of the carrying bag, according to one embodiment, is sufficiently deep to accommodate the pliable portion of the carrying bag, while not in use. According to a modification of this embodiment, the carrying bag may be articulated over a top surface of the base cabinet in an bottom up position, i.e. such that the pliable bag is collapsed and fully received within a basin of the base portion, and the base portion is attached in this fashion to the base cabinet.

The handle of the assembly is fitted to the base cabinet and is typically a collapsible or telescopic handle deformable between a collapsed or retracted position and an operative extended or extracted position.

For easy displacement of the cabinet assembly into its tilted rolling position, there is formed, adjacent a bottom end of the base cabinet, a footstep portion for an individual to step on when tilting the assembly.

Attachment of the carrying bag to the base cabinet may be facilitated by a variety of arrangements of an attaching mechanism, e.g. sliding catch, pivotable latch, snapping closure, etc. It is appreciated that instead of the carrying bag there may be attached over the base cabinet a tool case made of rigid material, where articulation thereto may be facilitated by the same attaching mechanism.

The base cabinet typically comprises a pair of rear wheels for pulling the assembly by the handle (e.g. at a tilted position of the assembly). Optionally, there is provided one or more front swiveled wheels for both supporting the cabinet assembly at an essentially upright/erect position, and for pushing it so as to roll it at the erect position.

BRIEF DESCRIPTION OF THE DRAWINGS

In order to understand the invention and to see how it may be carried out in practice, some embodiments will now be described, by way of non-limiting examples only, with reference to the accompanying drawings, in which.

DETAILED DESCRIPTION OF EXEMPLARY EMBODIMENTS

Figure 1:
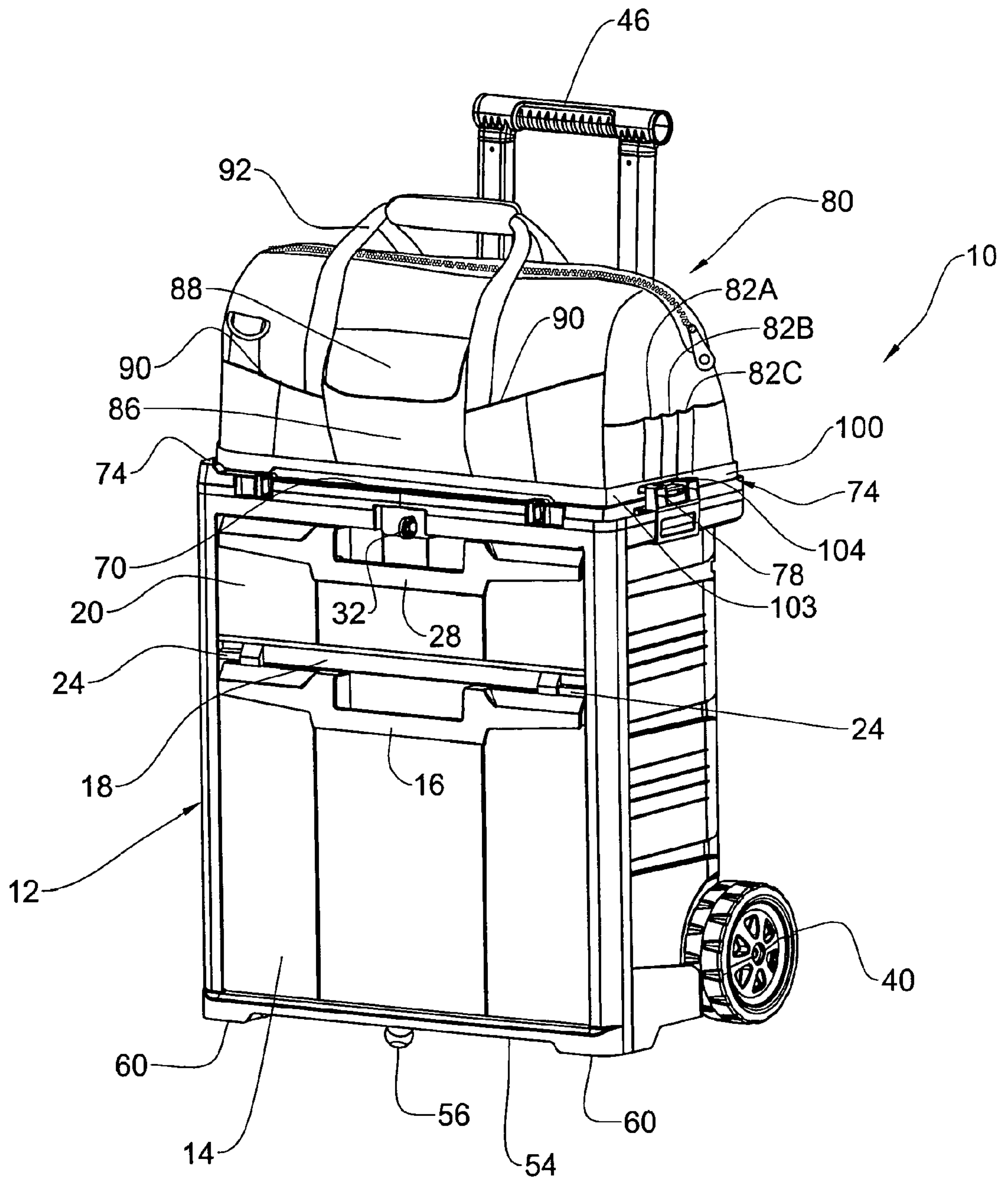
FIG. 1A is an isometric view of a wheeled cabinet assembly in accordance with a first embodiment of the present invention.

Attention is first directed to FIG. 1 of the drawings illustrating a cabinet assembly in accordance with the first embodiment of the present invention generally designated 10, comprising a rigid base cabinet 12 fitted with a tilting bin 14 accessible by pulling at handle 16 in a pivoting manner. Above the bin 14 there is a fixed shelf 18 giving rise to a storage compartment closable by a door 20 pivotally secured at 24 to the base cabinet. Door 20 is fitted with a handle 28 and an opening through which projects a locking eye 32, for a lock to be mounted, to thereby lock the compartment 18 and prevent unauthorized opening thereof.

Figure 2A:
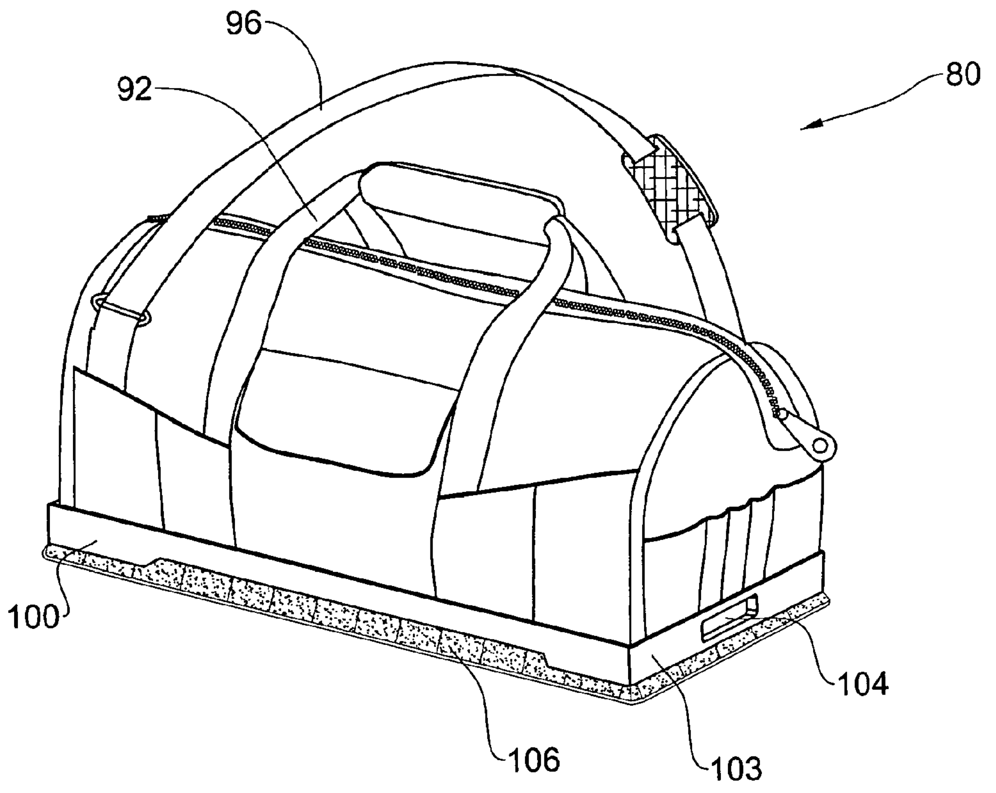
FIG. 2A is an isometric view of the carrying bag of the cabinet assembly seen in FIG. 1, detached therefrom.
Figure 2B:
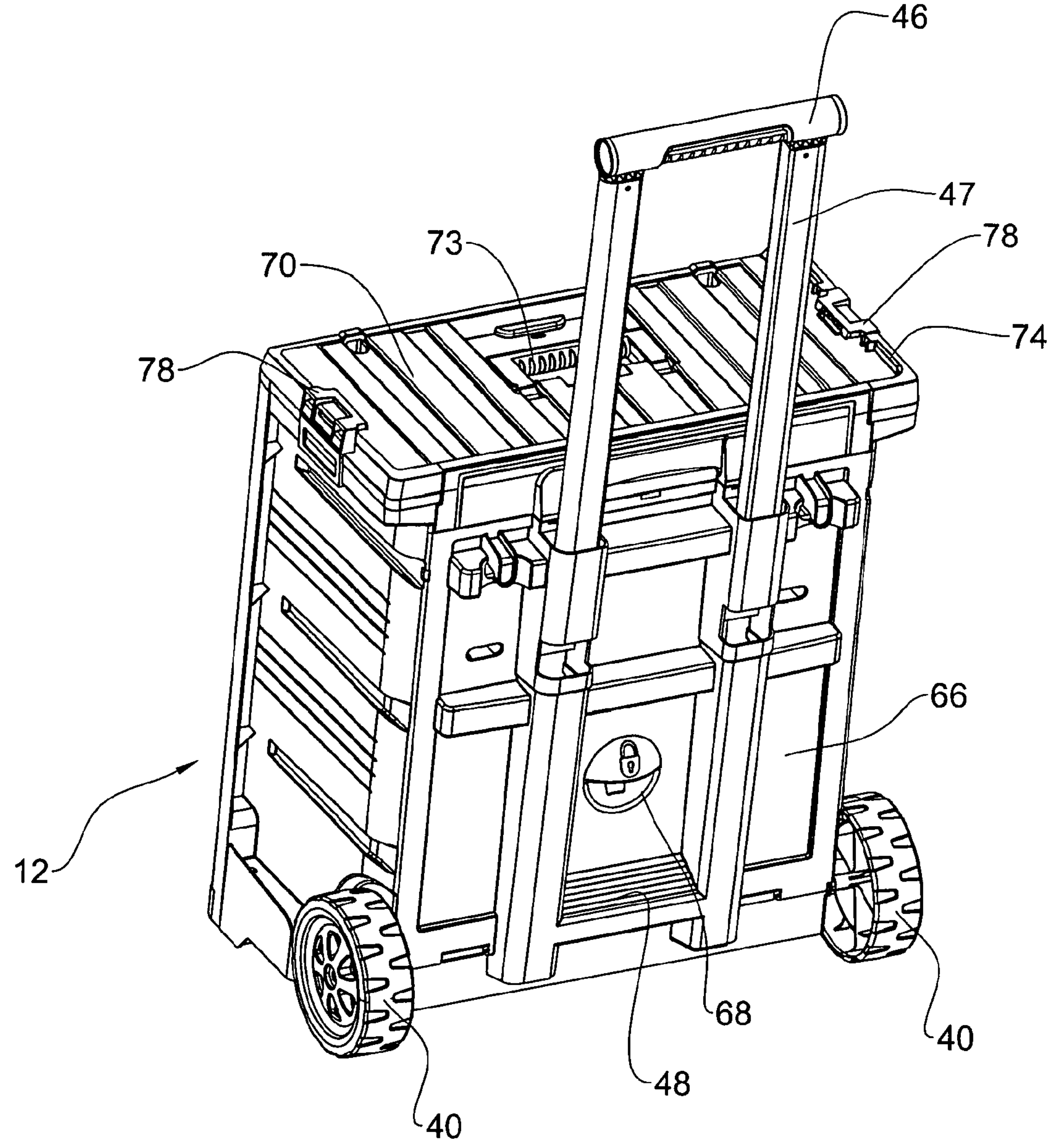
FIG. 2B is a rear isometric view of the base cabinet of the cabinet assembly seen in FIG. 1, with the carrying bag removed therefrom.

As can further be seen in FIGS. 1 and 2B, the base cabinet 12 comprises a pair of wheels 40 (only one seen in FIG. 1) fitted at a rear lower end of the base cabinet so as to facilitate locomoting the cabinet assembly by pulling at handle 46. As can be seen also in FIG. 2B, the handle 46 is in the form of a telescopic handle with two retractable bars 47 displaceable between a retracted position (not shown) and an operative position in which the handle is extracted as in the figures, to facilitate displacement of the cabinet assembly 10 by pulling. For that purpose, the cabinet assembly is typically tilted over the rear wheels 40 and there is formed, at lower portion of the rear face of the cabinet base a footstep portion 48 to assist in tilting of the cabinet.

In the embodiment of FIG. 1 the a base 54 of the base cabinet 12 is fitted with a front swiveled wheel 56 both for supporting the cabinet assembly 10 at its essentially erect position and also to facilitate pushing it as to roll it at this erect position (typically over a short distance i.e. repositioning). The swiveled wheel 56 may be integrated with the base 54 of the base cabinet or it may be detachably articulated thereto. Alternatively, or in addition, the bottom wall of the base cabinet is formed with rests 60 for supporting the cabinet assembly 10 while at the erect position, in rest.

Also noticeable in FIG. 2B, the base cabinet 12 is fitted at its rear wall 66 with a locking eye 68 engageable with a rear wall of the tilting bin 14 to thereby lock the tilting bin 14 and prevent unauthorized opening thereof.

Still noticed in FIG. 2B, a top wall 70 of the base cabinet 12 is fitted with a handle 73 to thereby facilitate lifting the base cabinet and carrying it over obstacles, inserting it into a car, etc. handle 73 substantially does not project from the surface of the top wall 70.

It is further noticed that the top wall 70 is formed with a seating in the form of a partial peripheral shouldering rim 74 and with two pivot latches 78, one at each side of the base cabinet 12, the purpose of which will become apparent hereinafter.

As seen in FIG. 1, and in detail in FIG. 2A, a carrying bag 80 is mounted on the top wall 70 of the base cabinet 12, said carrying bag 80 being made of a resilient material such as reinforced cloth, Gortex®, nylon, etc. The carrying bag 80 is typically formed with a plurality of pockets 82A, 82B, 82C, etc., each sized to accommodate different pieces of equipment and gear at user's choice. The bag 80 further comprises an external pocket 86 closed by a flap cover 88 and several pockets 90 adapted to receive a carrying handle 92 or a shoulder strap 96 (FIG. 2A), respectively, when not in used.

The arrangement is such that the carrying bag 80 is made of a pliable material and is formed with a rigid base portion 100, said base portion retaining a fixed shape and comprises depressions 104 at opposed sides thereof fitted for engagement by latches 78 of the base cabinet 12.

Base portion 100 of carrying bag 80 is sized and shaped for receiving over the top wall 70 of base cabinet 12 such that the side walls 103 are at least partially supported by peripheral shouldering rim 74 of the base cabinet.

Figure 3A:
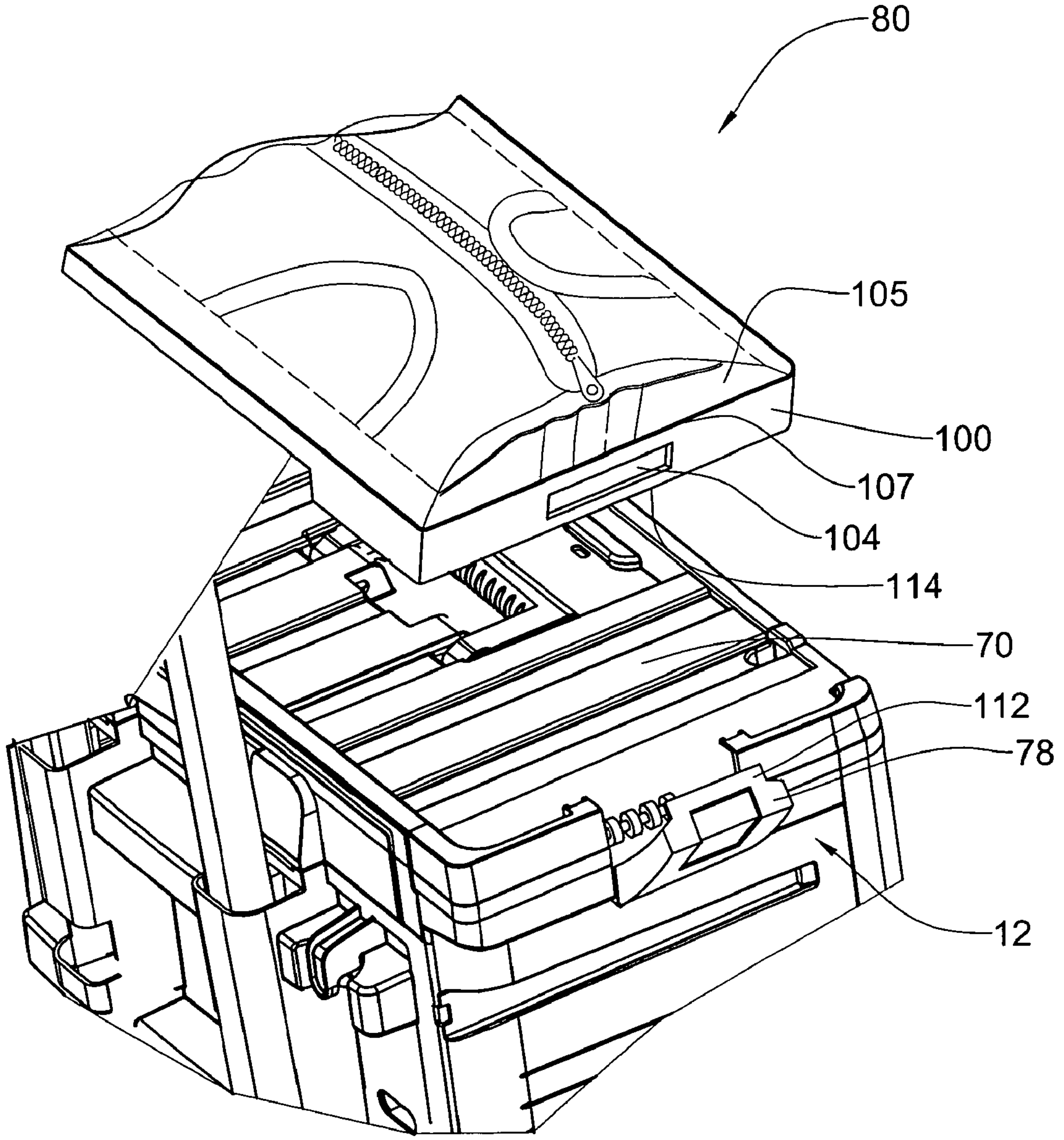
FIG. 3A is an exploded isometric view of a portion of the wheeled cabinet assembly of FIG. 1, illustrating the latching mechanism, wherein the base portion of the carrying bag is illustrated in solid and the body portion thereof is illustrated in dashed lines.
Figure 3B:
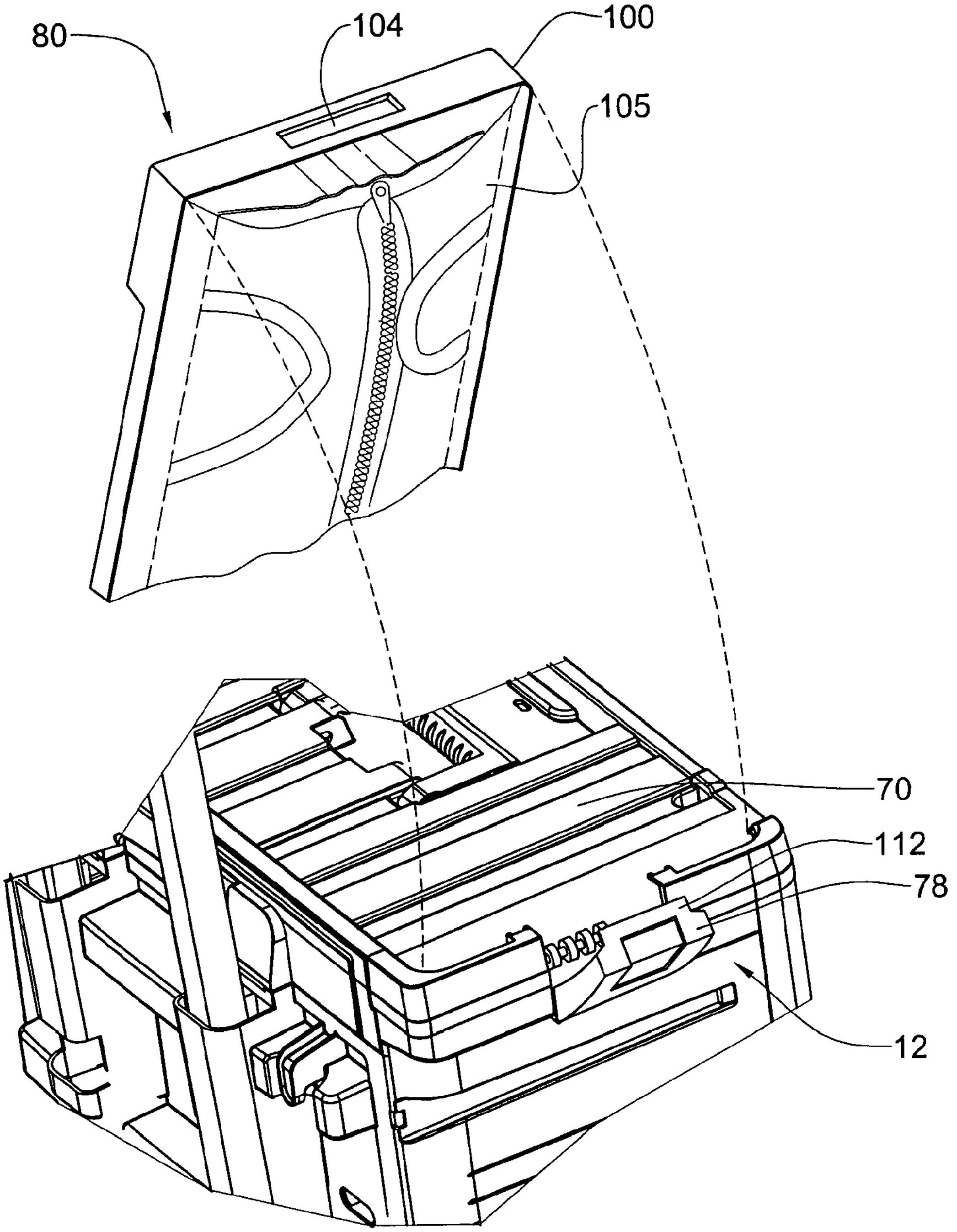
FIG. 3B is "bottoms up" view of FIG. 3A.

As can be seen in FIGS. 3A-B, the base portion 100 of the carrying bag 80 is in the form of a solid basin-like structure into which the fabric structure of the carrying bag is fixedly fitted (see FIG. 2A). In accordance with the embodiment of FIGS. 3A-B, the base member 100 is designed that such when it is assembled over the base cabinet 12, there is a gap formed between a bottom surface of the bottom portion 100 and the top wall surface 70 of the base cabinet 12. This gap can be used for example to store shoulder strap 96 of the carrying bag, a pair of back straps (not shown), etc.

The bottom surface of the bottom portion 100 may be padded with a soft material to facilitate carrying of the soft bag 80 as a back pack.

Whilst the base portion 100 of the carrying bag can be a solid basin-like member, it should be realized that the base member may also be in the form of a rigid frame with pliable material attached thereto for constituting the base of the carrying bag.

The basin-like base portion 100 of the carrying bag 80 is illustrated in the embodiment of FIGS. 3A-B such that it is sufficiently deep to receive the pliable portions of the carrying bag 80 collapsed into the basin 105 such that it does not extend over the edges 107, in a storage position.

In accordance with a modification (FIG. 3B) the carrying bag is designed such that its base portion may be articulated to the base cabinet 12 in an inverted position (i.e. 'bottoms up') such that the pliable portions of the carrying bag 80 are fully received within the basin 105 and the gap extending over the top wall 70 of the base cabinet 12.

Also seen in more detail in FIG. 3A is the pivoting latch 78 which in this figure is illustrated in its open position with its claw 112 adapted for arresting wall portion 114 of base portion 100.

Figure 4A:
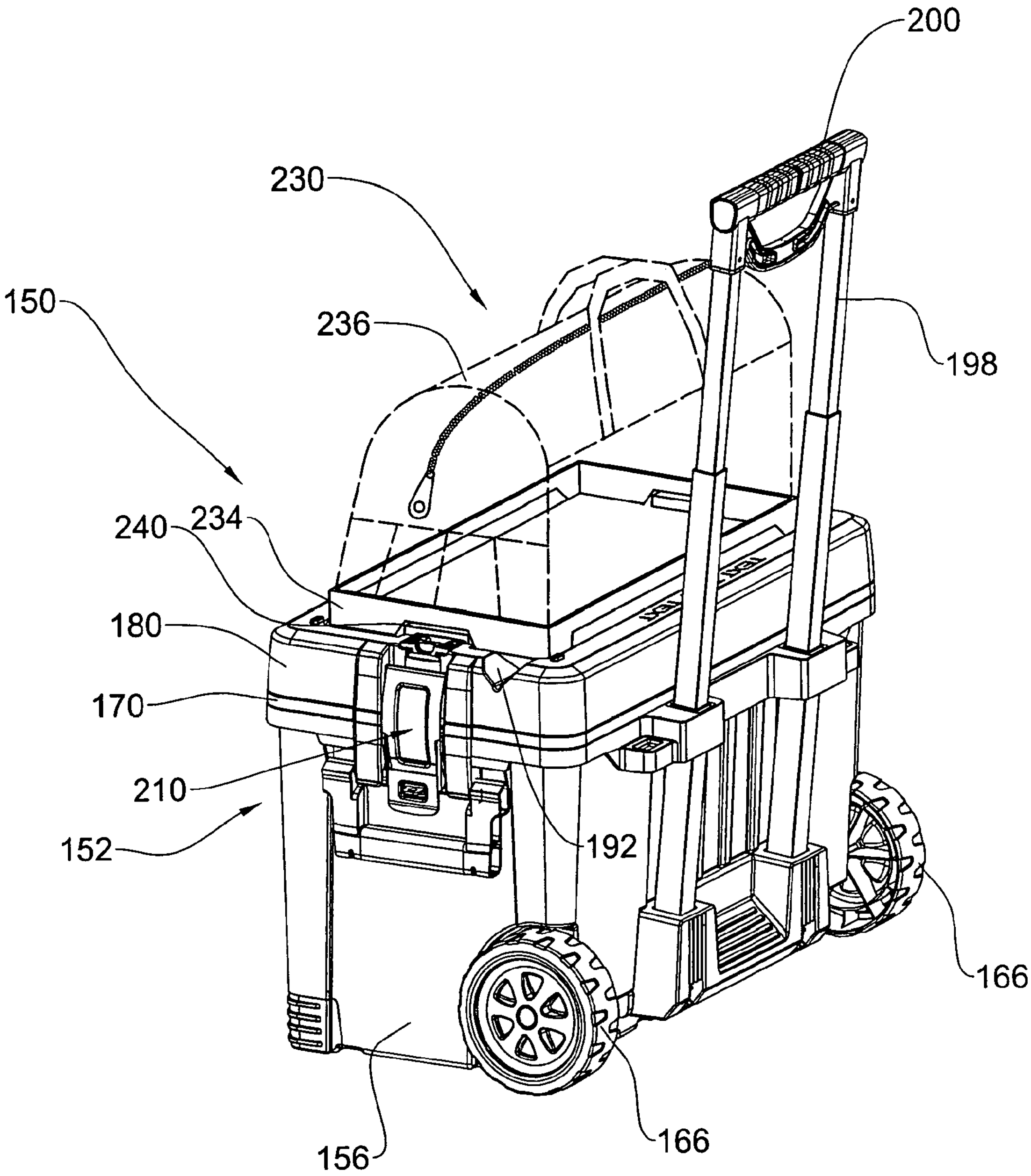
FIG. 4A is a rear isometric view of a cabinet assembly in accordance with a second embodiment of the present invention, the carrying bag shown partially in dashed lines.
Figure 4B:
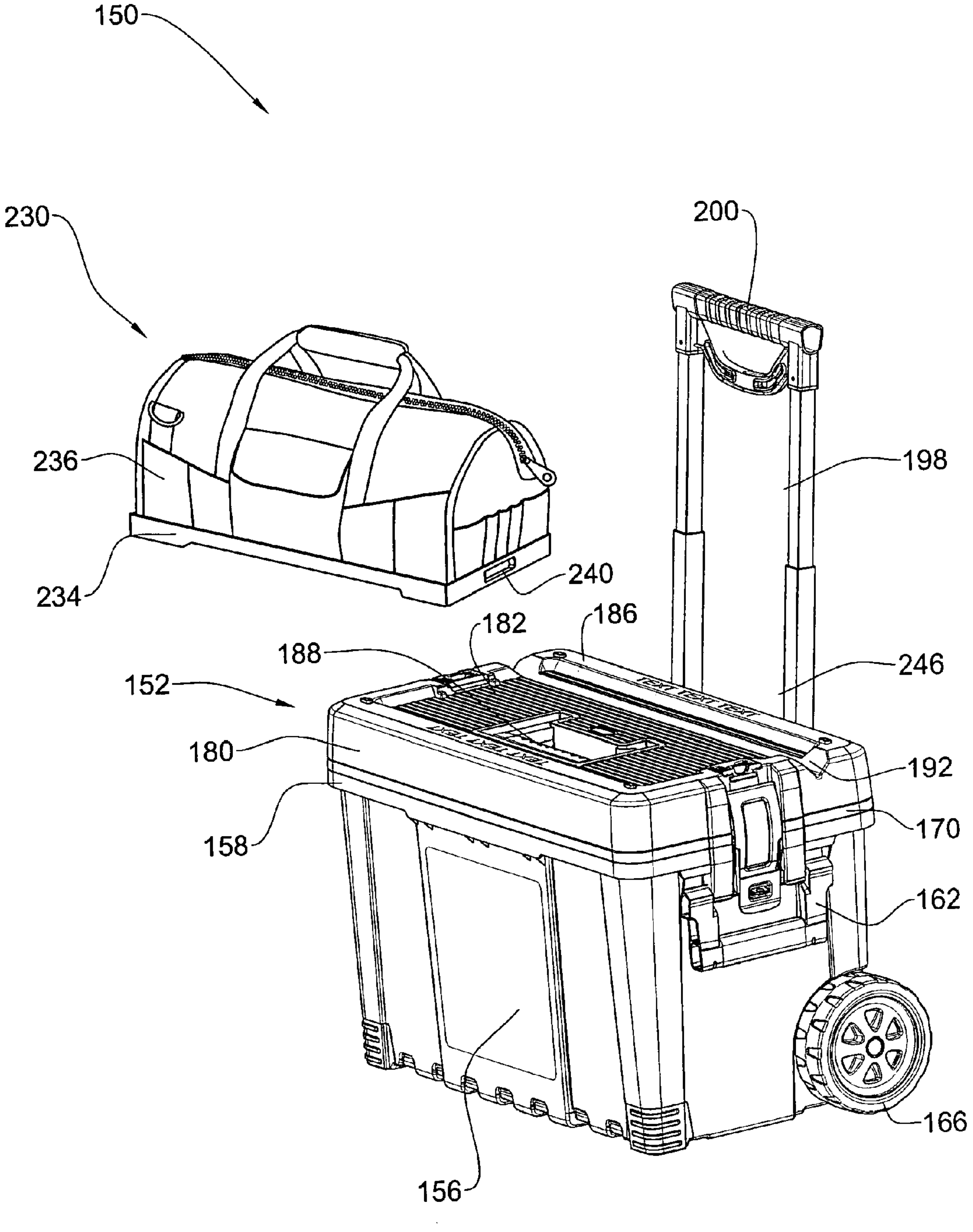
FIG. 4B is a front isometric view of the cabinet assembly seen in FIG. 4A, with the carrying bag disengaged from the base cabinet.
Figure 5:
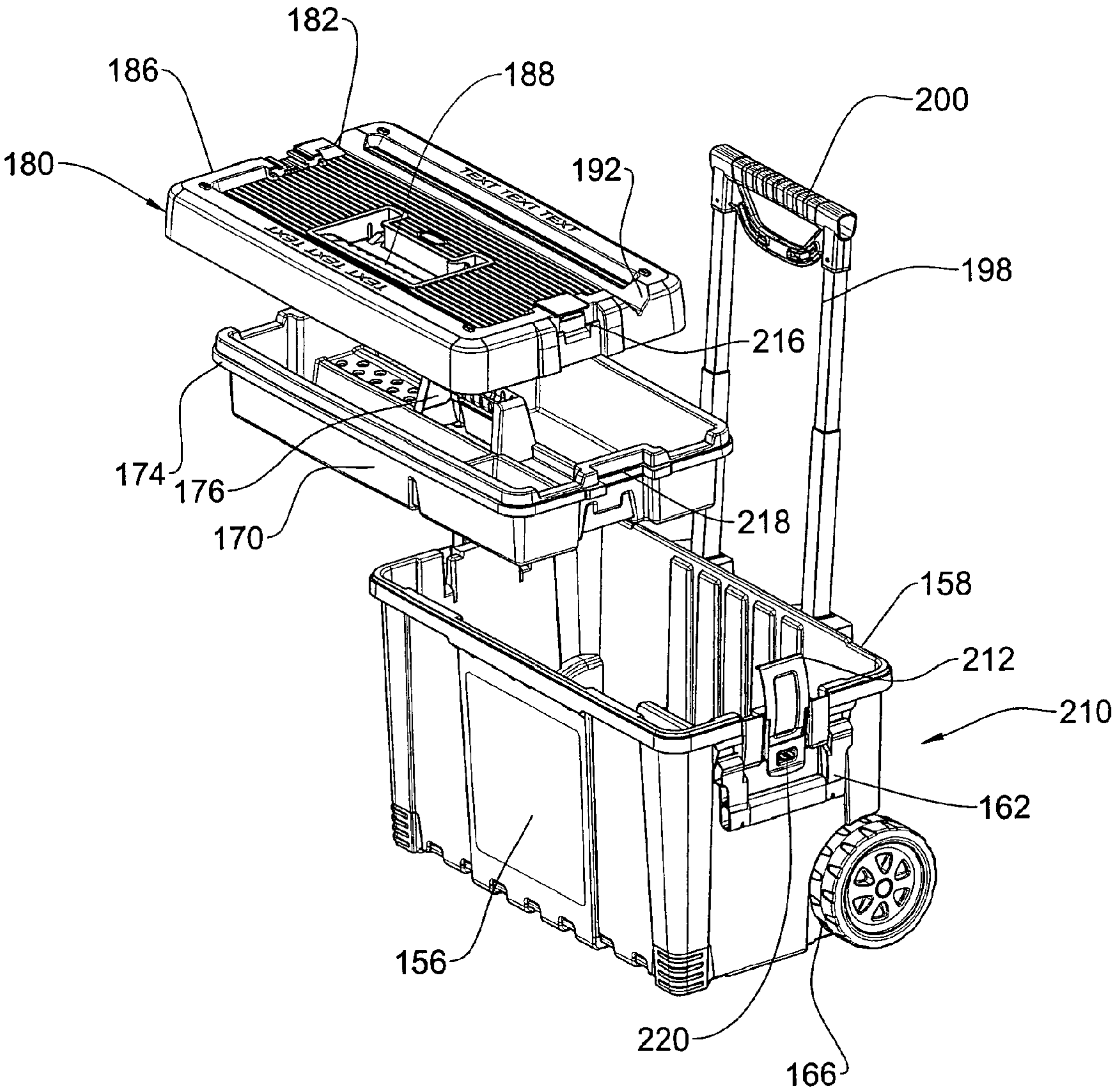
FIG. 5 is a front exploded isometric view of the base cabinet of the cabinet assembly seen in FIGS. 4A and 4B.
Figure 6:
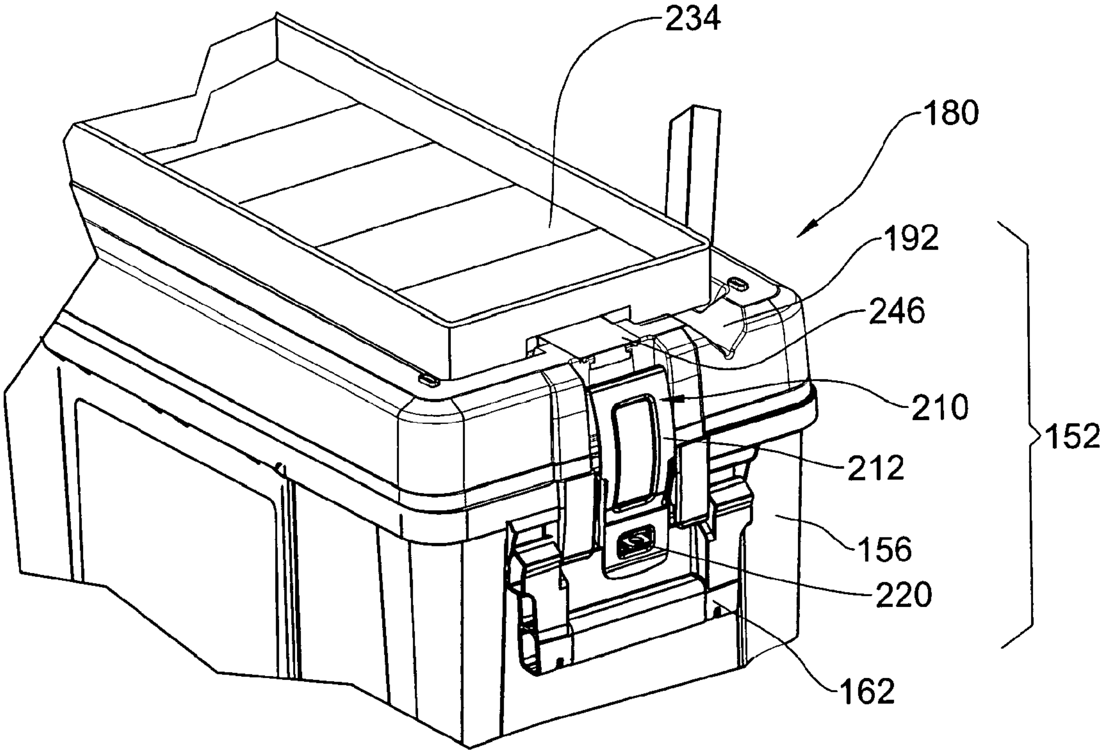
FIG. 6 is an isometric view of a latching portion of the cabinet assembly illustrated in FIGS. 4A and 4B.

Turning now to FIGS. 4 to 6 of the drawings there is illustrated a different embodiment of the present invention generally designated 150. In this embodiment, the rigid base cabinet 152 comprises a bucket 156 having an open top defined by a peripheral top edge 158 and fitted at two opposed side walls thereof with carrying handles 162. A pair of rolling wheels 166 are pivotally secured at a bottom rear edge of the cabinet assembly 152.

The cabinet assembly 152 further comprises a tray member 170 formed with a peripheral rim 174 adapted for resting over top edge 158 of bucket 156 and further fitted with a carrying handle 176 to assist in removal thereof. Tray 170 is compartmented for storage of small articles such as screwdrivers, bolts, drilling bits, etc.

Mounted over the tray 170 there is a cover 180 fitted for assembly over the peripheral shoulder 174 of tray 170. Cover 180 has a top wall 182 depressed below its upper surface 186 and comprising a central handle 188 to facilitate transporting the base cabinet, at its closed position, e.g. over obstacles, etc., by lifting thereof.

As can further be seen, best in FIGS. 4B and 6, the top cover 180 is formed at its top wall with a V-like longitudinal groove 192 serving to support a longitudinal work piece, e.g. while cutting, drilling, etc.

The cabinet assembly 152 further comprises a locomoting handle 198 which, similar to the previous embodiment, is a telescopic retractable handle, shown in FIGS. 4A to 6 in its fully extracted operative position. However, in its retracted position, the handlebar 200 does not project over the upper surface 186 of cover 180.

Further noticeable is a latching mechanism generally designated 210 (see also FIG. 6) comprising a latch 212 pivotally articulated to the bucket 156 adapted to simultaneously engage with a latch arresting portion 216 (FIG. 5) of the cover 180 and a recess portion 218 of the tray 170, so as to interlock the bucket 156, the tray 170 and the cover 180 to thereby form a unitary base cabinet 152. The latch 212 comprises an opening through which extends a locking eye 220 for retaining the base cabinet 152 in a closed position to prevent unauthorized opening thereof.

As mentioned above, the top wall 182 of cover 180 is depressed and extends below a upper surface 186 thereof thus forming a seating surface to accommodate a detachable container (carrying bag 230), shown in the exploded view of FIG. 4B and illustrated in FIG. 4A such that its base portion 234 is illustrated in solid lines and the pliable body 236 is illustrated in this figure by dashed lines.

Similar to the previous embodiments, the carrying bag 230 has a rigid base portion 234 fitted for snugly receiving over the surface 182 of top cover 180, said bottom portion 234 comprises at its each of it's two side edges a depression 240 fitted for arresting by a sliding latch 246 fitted on cover 180 for detachably articulating the carrying bag 230 over the base cabinet 152. Disengagement of the carrying bag 230 from the base cabinet 152 is facilitated by slidingly displacing the latch 246 away from the base member 234, so as to disengage from the depressions 240.

Whilst some embodiments have been described and illustrated with reference to some drawings, the artisan will appreciate that many variations are possible which do not depart from the general scope of the invention, *mutatis, mutandis.*

For example, the base cabinet may be designed in different modules and comprise any combination of drawers, bins, shelves and removable compartments (rigid or pliable). Furthermore, articulation of the pliable compartment, namely the carrying bag, may be facilitated by other arrangements then those disclosed.

The invention claimed is:

1. A cabinet assembly comprising a wheeled base cabinet fitted with a locomoting handle, and at least one detachable container made from a pliable material and designed as an independent carrying bag, wherein a base portion of the carrying bag is attachable over a top edge of the base cabinet at both an upright position and at a bottoms-up position.

2. A cabinet assembly according to claim 1, wherein the carrying bag is substantially made of pliable material and is fitted with carrying arrangements being one or more of handles, shoulder straps and back straps.

3. A cabinet assembly according to claim 2, wherein a base portion of the carrying bag is padded on an exterior thereof for use as a back pack.

4. A cabinet assembly according to claim 1, wherein a base portion of the carrying bag is made of a substantially rigid material and is fitted for detachable articulation to the wheeled based cabinet.

5. A cabinet assembly according to claim 4, wherein the base portion of the carrying bag is a solid member or in the form of a frame supporting a sheet material serving as a base.

6. A cabinet assembly according to claim 1, wherein the carrying bag is detachably mounted over a top surface of base cabinet such that there extends a gap between said top surface and between the base portion of the carrying bag, said gap serving as a storage compartment for carrying straps of the bag, while not in use.

7. A cabinet assembly according to claim 1, wherein the base cabinet is in the form of a bucket with an open top edge closable by a tray, and where the carrying bag is fitted for detachably interconnecting to the tray and bucket or directly to the top edge of the bucket.

8. A cabinet assembly according to claim 1, wherein an uppermost member of the base cabinet is formed with a top wall surface for supporting the carrying bag.

9. A cabinet assembly according to claim 8, wherein the top wall of the uppermost member is formed with a shouldering rim for at least partially supporting and snuggling respective portions of a base portion of the carrying bag.

10. A cabinet assembly according to claim 3, wherein the base portion of the carrying bag is sufficiently deep to accommodate the pliable portion of the carrying bag, while not in use.

11. A cabinet assembly according to claim 10, wherein when the carrying bag is articulated over said top edge in said bottoms up position, the pliable bag is received within a space formed between a basin of said base portion and said cabinet assembly.

12. A cabinet assembly according to claim 1, wherein the locomoting handle of the assembly is fitted to the base cabinet and is a collapsible or telescopic handle deformable between a collapsed or retracted position and an operative extended or extracted position.

13. A cabinet assembly according to claim 1, wherein adjacent a bottom end at a rear wall of the base cabinet there is a footstep portion for tilting the assembly into its rolling position.

14. A cabinet assembly according to claim 1, wherein the carrying bag is articulated to the base cabinet by one of a sliding catch, a pivotable latch and a snapping closure.

15. A cabinet assembly according to claim 1, wherein the carrying bag is replaceable by a rigid compartment formed with a base mimicking that of the base portion of the carrying bag.

16. A cabinet assembly according to claim 1, wherein the base cabinet is fitted with a pair of rear wheels for pulling the assembly by a handle and further there is provided one or more front swiveled wheels for both supporting the cabinet assembly at an essentially erect position, and for pushing it so as to roll it at the erect position.

17. A cabinet assembly according to claim 1, wherein the base cabinet comprises one or more bins tiltable between an inclined, open position and an upright closed position.

18. A cabinet assembly according to claim 1, wherein the base cabinet comprises one or more drawer or trays slidingly received within the base cabinet.

19. A cabinet assembly according to claim 1, wherein the base cabinet is part of a modular system comprising modular compartment elements adapted for interconnecting such that a user may assemble an array of compartments and cabinets to create a base cabinet, however with the carrying bag constituting one of said modular elements, adapted for articulating as an uppermost component.

* * * * *